June 18, 1929.  C. A. BORLAND ET AL  1,717,831

VOLTAGE REGULATOR

Filed March 31, 1927

Inventors
Carl A. Borland
August F. Melching
by H. W. Patterson Att'y.

Patented June 18, 1929.

1,717,831

UNITED STATES PATENT OFFICE.

CARL ALLEN BORLAND, OF LA GRANGE, AND AUGUST FRED MELCHING, OF FOREST PARK, ILLINOIS, ASSIGNORS TO WESTERN ELECTRIC COMPANY, INCORPORATED, OF NEW YORK, N. Y., A CORPORATION OF NEW YORK.

VOLTAGE REGULATOR.

Application filed March 31, 1927. Serial No. 179,780.

This invention relates to a voltage regulator, and more particularly to a regulator for maintaining the voltage of a direct current line at a constant value.

An object of the invention is to provide an accurate and efficient voltage regulator which is capable of maintaining a predetermined voltage within very close limits.

The invention contemplates balancing the voltage of a direct current line against a potentiometer voltage. In accordance with one embodiment of the invention, an apparatus is provided which is responsive to an unbalance between the line voltage and the potentiometer voltage to actuate a rheostat in the line and restore the balanced condition.

It is believed that a complete understanding of the invention may be had by reference to the following description taken in conjunction with the accompanying drawing, in which Fig. 1 is a perspective view of the apparatus for operating the rheostat;

Figure 1:
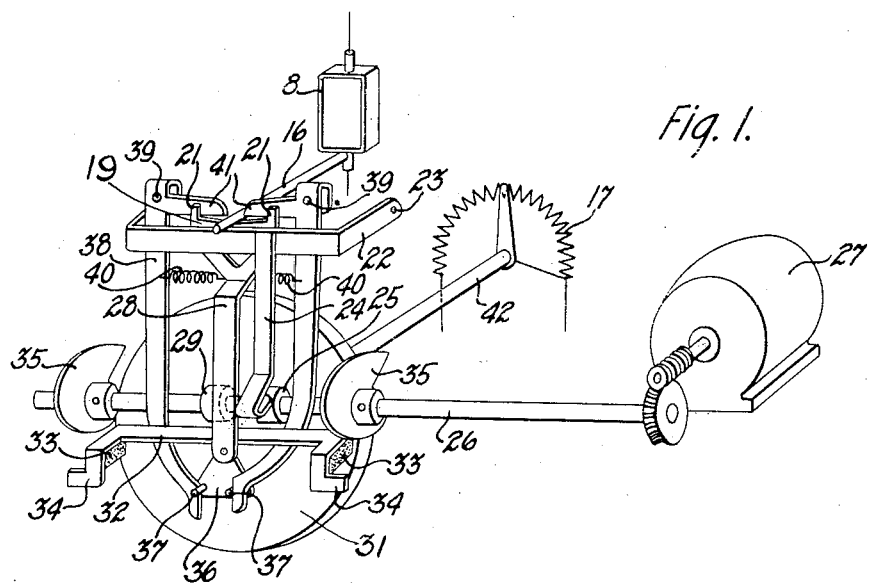

Referring to the drawing in which similar reference characters designate the same parts in the several views, a potentiometer circuit 4 (Fig. 2) contains a battery 5 and a resistance element 6. In order to maintain the voltage across the resistance 6 at a constant value, a variable rheostat 7 is provided in the potentiometer circuit which may be adjusted in accordance with the reading of a galvanometer 8 by engaging a switch arm 9 with a contact 10, placing a standard cell 11 in opposition to the battery 5. When the voltage across the resistance element is adjusted to a proper value, the switch arm 9 is engaged with a contact 12 placing a portion A—B of the resistance element 6 across a direct current line 13 whose voltage is to be regulated. The line 13 receives its energy from any suitable source, such as a storage battery 14, which may be charged by means of a charger 15 of any suitable type from any suitable source of alternating current. As long as the voltage of the line 13 is equal to the potential difference across the element A—B of the resistance 6, no current will flow through the galvanometer 8, but when the voltage of the line varies from the potential difference across the section A—B a needle 16 (Fig. 1) of the galvanometer 8 will be deflected either to the right or the left, depending upon whether the line voltage is greater or less than the constant value of the potential difference across the section A—B. The deflection of the galvanometer needle 16 causes the adjustment of a rheostat 17, thereby regulating the voltage of the line 13 tending to keep it constant. The resistance 17 may be shunted by a low resistance 18 so that only the adjusting current is required to flow through the rheostat 17.

Figure 2:
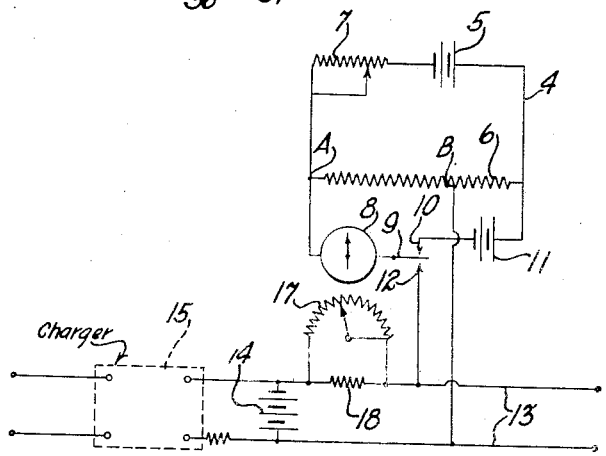
Fig. 2 is a diagrammatic view of the circuit employed in the apparatus.

The mechanism for causing the adjustment of the rheostat 17 in accordance with the deflection of the galvanometer needle 16 is illustrated in detail in Fig. 1 in which the needle 16 is shown resting upon a ledge 19 which rises from the center towards either end and terminates in a pair of projections 21 which limit the deflection of the needle. The ledge 19 is fixed to a U-shaped member 22 pivoted at 23 which carries an arm 24, the lower end of which contacts with a cam 25 mounted on a shaft 26 which is continuously rotated by a motor 27 causing a rising and falling of the U-shaped member 22 and the ledge which imparts a similar movement to the end of the needle which rests thereupon. A resilient arm 28 engages a second cam 29 on the shaft 26 which tends to continuously move the arm toward and away from a disk 31. To the lower end of the arm 28 is pivoted a cross arm 32 which carries a pair of shoes 33 which are adapted to frictionally engage the disk 31 when the arm 28 is moved toward the disk. The cross arm 32 terminates in a pair of projections 34 which are located in such a position that a pair of rotating cams 35 will not normally strike them. A plate 36 is fixed to the cross arm 32 and carries a pair of pins 37 which are engaged by arms 38 which are held in engagement with the pins by means of springs 40. The arms 38 are pivoted at 39 and are provided with projections 41. When the galvanometer needle is deflected it will tend to pass under one of the projections 41 and upon the rising of the member 22 the projection 41 will be raised, moving the arm 38, causing it to displace the plate 36 and pivot the arm 32 about its center. At this time the cam 29 will act to allow the shoes 33 to frictionally engage the disk 31, and as the cam 35 is rotated it will contact with the projection 34 to return it to its normal position and carry the disk 31 with it, thereby rotating a shaft 42 to adjust the resistance 17 to such a value as to cause the galvanometer needle to return to its central position indicating that the voltage is of the correct value and equal to the potential difference across the section A—B of the resistance 6.

Figure 3:
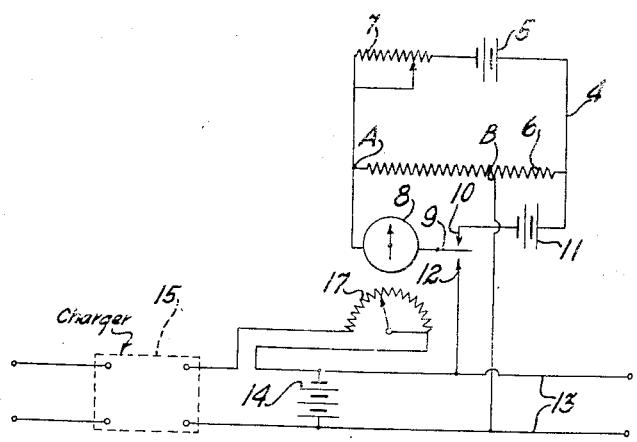
Fig. 3 is a diagrammatic view of a modified form of the circuit.

A modified form of the invention is shown in Fig. 3 in which the resistance 17 is placed between the battery 14 and the charger 15. When the voltage of the line tends to vary in this embodiment of the invention, the charging current applied to the battery 14 will be increased or decreased as the circumstances require to return the voltage delivered to the line to its normal value.

It will be understood that the embodiment of the invention herein described and illustrated is merely a convenient and useful form of the invention which is capable of many other modifications without departing from the spirit and scope of the invention.

What is claimed is:

1. In a regulator for maintaining the voltage of a line constant, a resistance associated with the line, means for maintaining a constant potential difference across the resistance, and means for maintaining the voltage of the line equal to said potential difference.

2. In a voltage regulator, a resistance, means for maintaining a constant potential difference across the resistance, a rheostat for adjusting the voltage of a line, and means responsive to a variation between the line voltage and the constant potential difference across the resistance for adjusting the rheostat to keep the line voltage constant.

3. In a voltage regulator, means for adjusting the voltage of a line, a resistance, means for maintaining a constant potential difference across said resistance, and means for operating said adjusting means in response to a variation between said constant potential difference and the line voltage.

4. In a voltage regulator, a rheostat for adjusting the line voltage, a resistance, means for maintaining a constant potential difference across said resistance, and means for operating the rheostat for maintaining the line voltage equal to said potential difference.

5. In a regulator for maintaining the voltage of a line constant, a potentiometer circuit including the line to be regulated as one branch thereof, a current responsive device in the potentiometer circuit, and means controlled by the current responsive device for balancing the voltage of the line against the voltage of the potentiometer.

6. In a regulator for maintaining the voltage of a line constant, a source of electrical potential, a system of resistances associated with said source of potential and adjusted to give a predetermined potential difference, a resistance connected in the line to be regulated, and means associated with the system of resistances and the line and responsive to a variation between the potential of the line and the predetermined value for adjusting the resistance connected in the line.

In witness whereof, we hereunto subscribe our names this 17th day of March, A. D. 1927.

CARL ALLEN BORLAND.
AUGUST FRED MELCHING.